Figure 1:
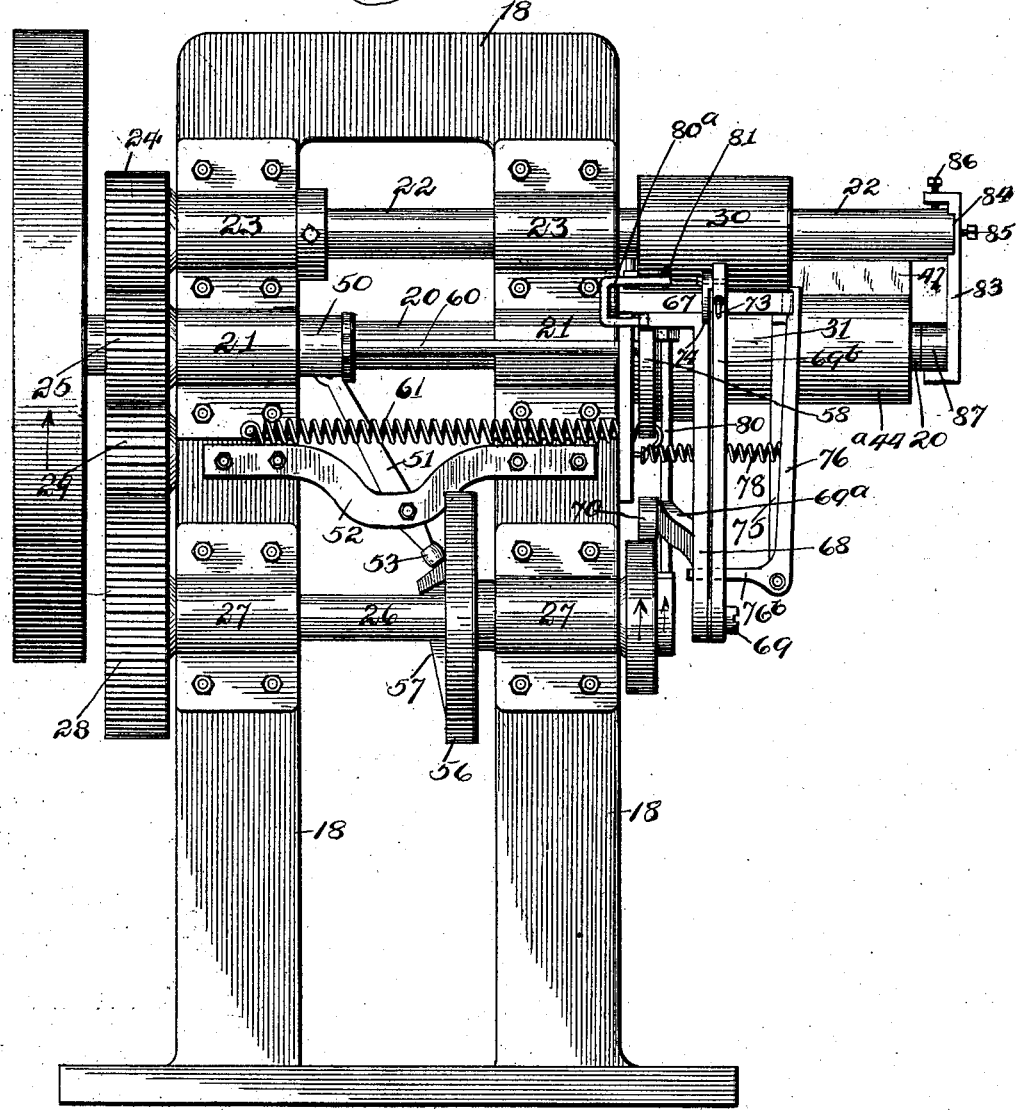

No. 693,325. Patented Feb. 11, 1902.
G. F. LEIGER.
MACHINE FOR MAKING CAN BODIES.
(Application filed Nov. 18, 1901.)

(No Model.) 7 Sheets—Sheet 1.

Witnesses:

Inventor:
George F. Leiger

No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 2.
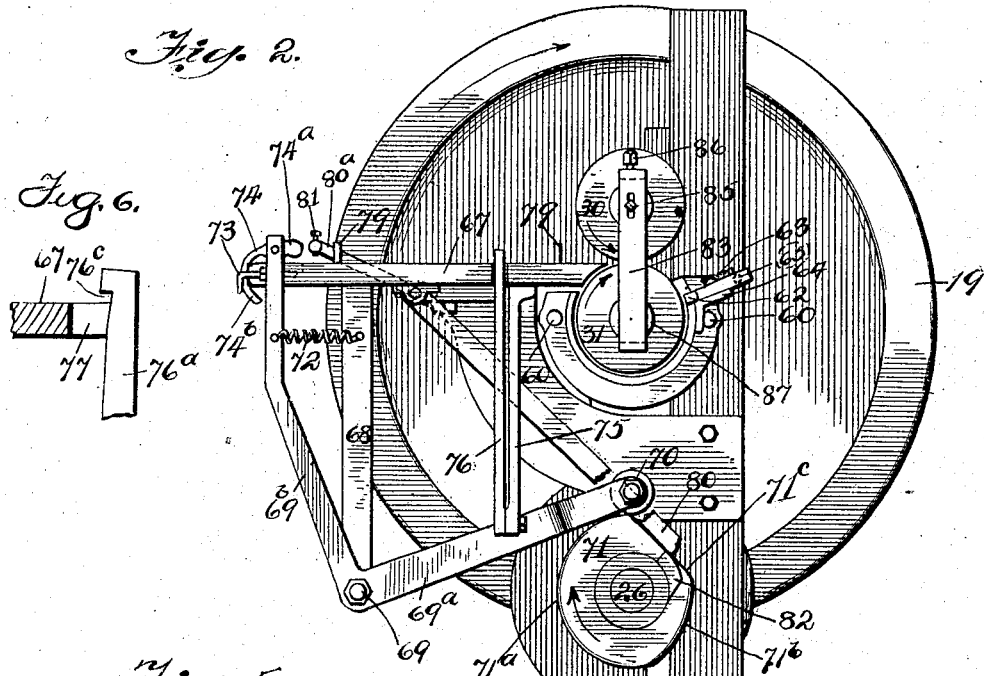
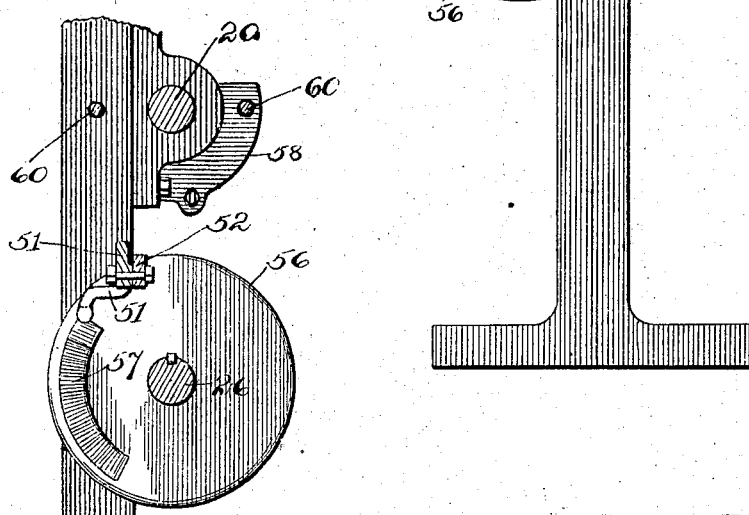

No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 3.
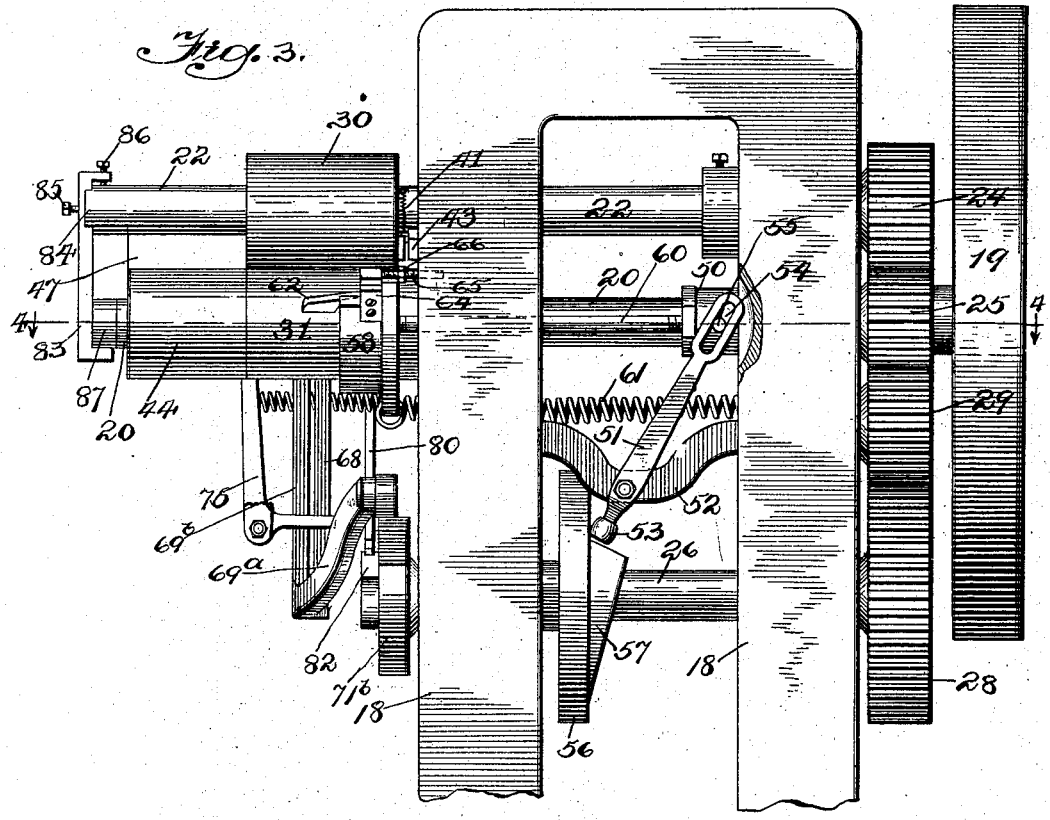
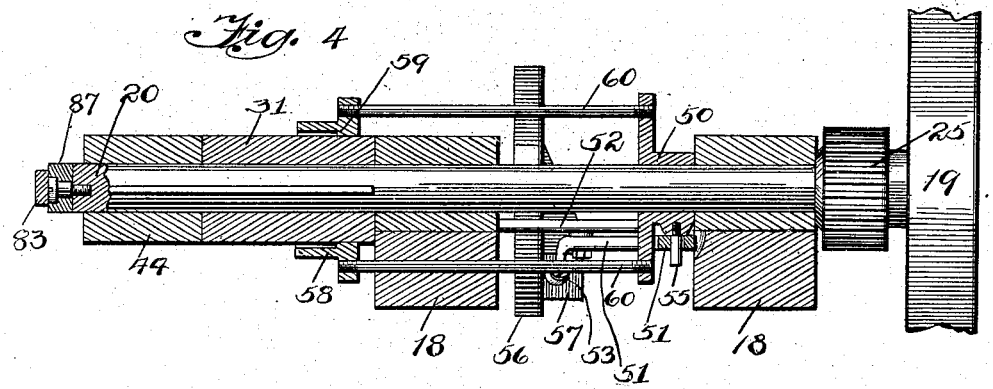

No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 4.
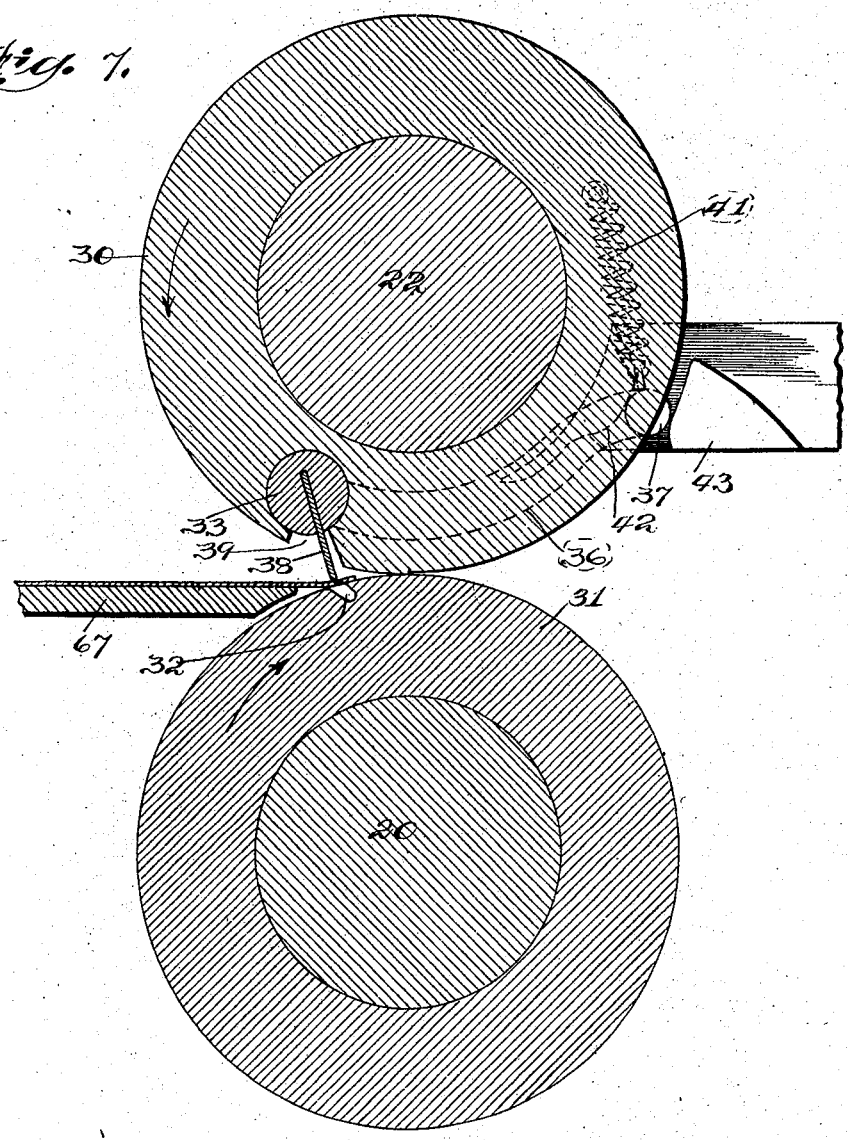
Fig. 7.
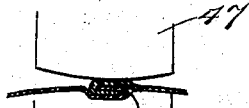
Fig. 17ª.
Witnesses: Inventor:
George F. Leiger
by Bond, Adams, Pickard & Jackson
his Attorneys No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 5.
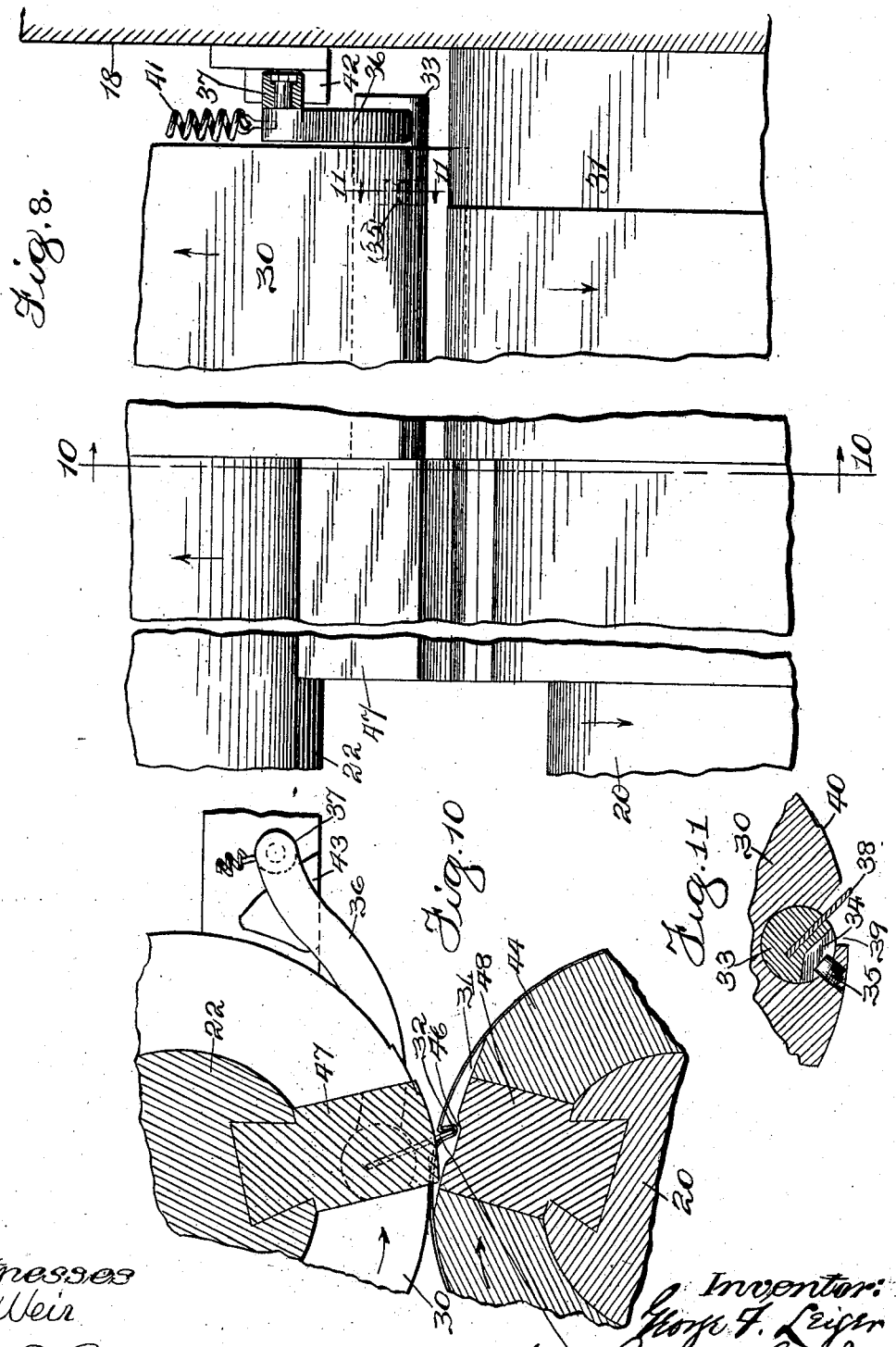

No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 6.
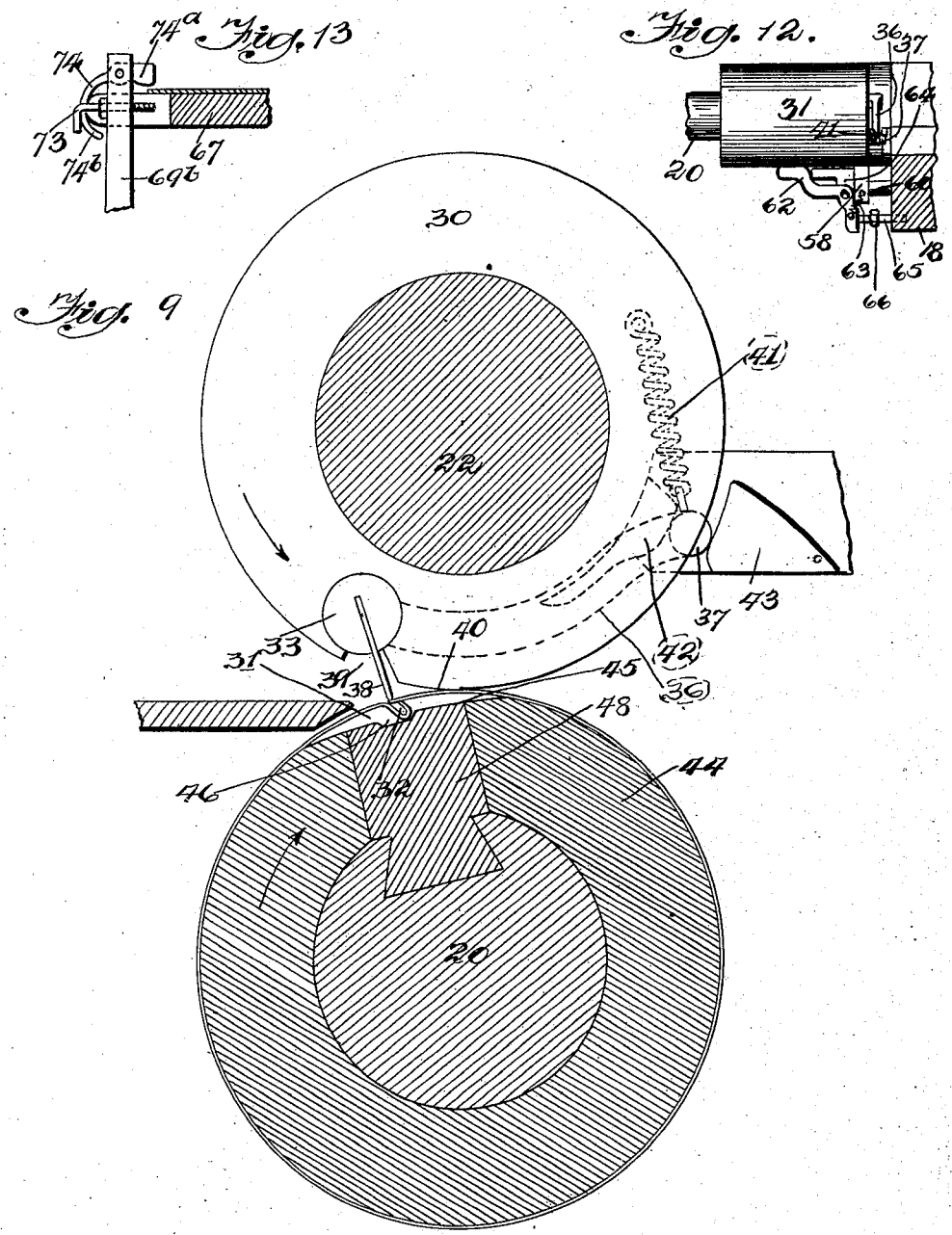
Witnesses:
JB Weir
Inventor:
George F. Leiger
by Bond, Adams, Pickard & Jackson
his Attorneys No. 693,325. Patented Feb. 11, 1902.
G. F. LEIGER.
MACHINE FOR MAKING CAN BODIES.
(Application filed Nov. 18, 1901.)
(No Model.) 7 Sheets—Sheet 7.
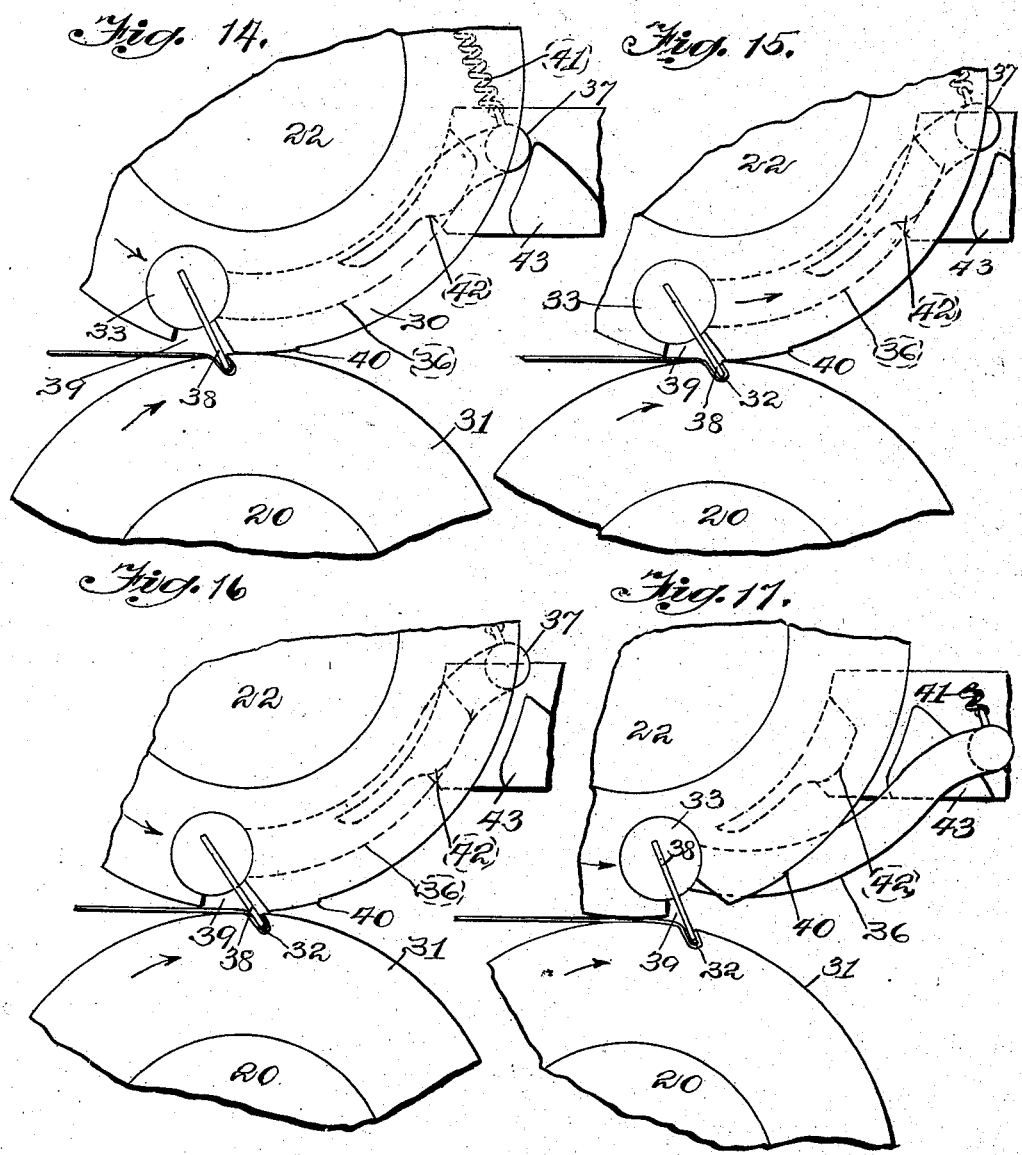

UNITED STATES PATENT OFFICE.

GEORGE F. LEIGER, OF CHICAGO, ILLINOIS, ASSIGNOR TO HIMSELF AND LEWIS BENEDICT, OF CHICAGO, ILLINOIS.

MACHINE FOR MAKING CAN-BODIES.

SPECIFICATION forming part of Letters Patent No. 693,325, dated February 11, 1902.

Application filed November 18, 1901. Serial No. 82,706. (No model.)

*To all whom it may concern:*

Be it known that I, GEORGE F. LEIGER, a citizen of the United States, residing at Chicago, in the county of Cook and State of Illinois, have invented certain new and useful Improvements in Machines for Making Can-Bodies, of which the following is a specification, reference being had to the accompanying drawings.

My invention relates to improvements in machines for making the bodies of cylindrical cans or other cylindrical articles made of sheet metal or other suitable material; and its principal object is to provide a new and improved machine for making cylindrical can-bodies or other similar articles out of sheets of metal or other suitable material, in which the edges of the sheet metal to form the can are bent over so as to form a locked seam upon the side, the sheets of metal bent into a cylindrical form, and the bent-over edges interlocked and firmly driven together to make a tight seam.

Another object of my invention is to provide new and improved rotary mechanism for making can-bodies and other similar articles having a locked side seam and for closely pressing the locked seam together and delivering the completed can-bodies from the machine.

Another object of my invention is to provide new and improved mechanism by which the sheets of metal to be formed into cans when placed upon the feeding-table are automatically put into proper position to be delivered accurately to the seam-bending and can-forming rollers.

Another object of my invention is to provide new and improved means by which the sheets of metal placed upon the feeding-table in accurate alinement with the rotary mechanism for making the can-bodies may be automatically and successively delivered to said rotary mechanism at the proper time to be formed into can-bodies.

Another object of my invention is the improvement of rotary mechanism for forming can-bodies and other similar articles in sundry details hereinafter set forth.

To that end my invention consists, first and broadly, of a roller whose circumference equals the circumference of the can-body or other cylinder to be formed, provided in its circumference with a longitudinal groove which enters said roller at an acute angle with a tangent to the surface of said roller in the direction of its rotation, of a coacting tucking-blade adapted to register with and enter the said slot at each rotation of the roller, and of mechanism connected with the tucking-blade adapted to cause the same to enter said slot substantially in a line with the projection of said slot into said roller as said roller rotates, whereby interlocking bends may be formed at each end of a sheet of metal and the bends locked together to form an interlocked side seam to the can-body or other cylindrical article.

My invention consists, further, in providing said rotary cylinder-forming, seam-forming, and seam-interlocking devices with automatic mechanism which shall free the completed can or other similar article from the forming-roller and in new and improved mechanism for pressing the formed seam tightly together.

My invention consists, further, in providing said can-forming, seam-forming, and seam-interlocking devices with new and improved automatic means for causing sheets of metal laid upon the feeding-table to be accurately alined to the can-forming roller and automatically delivered thereto successively at proper times.

My invention consists, further, in sundry detail improvements in cylinder-forming mechanism hereinafter specifically pointed out and claimed.

Referring to the drawings, Figure 1 is a side elevation of the machine seen from the delivery side. Fig. 2 is an end elevation of the machine viewed from the right in Fig. 1. Fig. 3 is a side elevation of a portion of the machine viewed from the opposite side from the elevation shown in Fig. 1. Fig. 4 is a longitudinal section on line 4 4 of Fig. 3. Fig. 5 is an enlarged detail, being a side view of the cam by means of which the completed can-bodies are removed from the forming-rollers. Fig. 6 is an enlarged detail, being a view of the end of the side-alining lever. Fig. 7 is an enlarged detail, being a crosssection through the can-forming, seam-forming, and locking-rollers, showing the end of the sheet of metal at the beginning of the bend for the locked seam. Fig. 8 is an enlarged detail, being a side view of the body-forming, seam-forming, and locking and seam-hammering rollers partly cut away. Fig. 9 is an enlarged detail, being an end view of the body-forming, seam-forming, and locking rollers, showing the can-body with the first seam formed and the interlocking seam in position to be formed, the devices being partly in section. Fig. 10 is an enlarged detail, being a section on line 10 10 of Fig. 8, showing the can with the locked seam formed, but still upon the forming-rollers. Fig. 11 is an enlarged detail, being a section of a portion of one of the rollers on line 11 11 of Fig. 8. Fig. 12 is a detail, being a top view of one of the can-forming, seam-forming, and seam-locking rollers and showing the devices for keeping the metal at tension during the operation. Fig. 13 is an enlarged detail, being a view of the upper end of the rear lever for forwarding the sheet of metal into the rollers and holding the end down during the process of forming the first seam bend. Figs. 14, 15, 16, and 17 are diagrammatic views showing the successive positions of the several parts of the rollers and tucking-blade during the formation of the seam bend, and Fig. 17ª is an enlarged detail showing the parts in position to press the locked seams.

In the drawings, 18 indicates the frame of a machine.

19 indicates a driving-pulley which is keyed or otherwise secured to the end of a shaft 20, which is journaled in suitable bearings 21 in the frame 18.

22 indicates a shaft which is journaled in suitable bearings 23 in the frame 18 of the machine and is provided at its outer end with a gear 24, which is keyed to the shaft 22 and meshes with a gear 25, keyed or otherwise secured to the shaft 20.

26 indicates a shaft which is journaled in suitable bearings 27 on the frame 18 and is provided at its outer end with a gear 28, which is keyed or otherwise secured to the shaft 26. The gear 28 meshes with an intermediate gear 29, which meshes with the gear 25. The gears 24 25 are of the same size, so that the shafts 20 and 22 revolve together at the same rate of speed. The gear 28 is of double the size of the gears 24 25, so that the shaft 26 is rotated once for every two revolutions of the shaft 20. By means of the intermediate gear 29 the gear 28 and the shaft 26 are caused to rotate in the same direction as the shaft 20.

30 indicates a roller which is keyed or otherwise secured to the outer end of the shaft 22 beyond the frame 18. 31 indicates a roller which is keyed or otherwise secured upon the outer end of the shaft 20 in alinement with the roller 30. The roller 31 is provided upon its periphery with a longitudinal slot 32, which enters said roller at an angle with a tangent to said roller of, preferably, about fifty degrees in the direction of the rotation of the rolls.

33 indicates a cylindrical rock-shaft which is mounted in a circular opening on the roller 30, fitting closely in said opening and adapted to be rocked therein, and is held from longitudinal movement in said roller 30, as is best shown in Fig. 11, by means of a slot 34 in said rock-shaft, which engages with a set-screw 35 in a suitable opening in said roller 30. The inner end of said rock-shaft 33 is provided with a lever 36, which is secured to the end of the rock-shaft 33 just beyond the inner surface of the roller 30, between it and the frame 18. The lever 36 is preferably of the shape shown in Figs. 7, 10, and other figures and is provided at its outer free end with a roller 37. The roller 37 is secured upon the end of the lever 36 upon its inner surface, facing toward the frame 18.

38 indicates a tucking-blade which is secured in a suitable slot in the rock-shaft 33 and projects outward through a longitudinal slot 39 in the roller 30, whereby the rock-shaft 33 may be by the mechanism hereinafter described given a limited rocking motion, the limit of the motion being determined by the size of the slot 39. The outer end of the tucking-blade 38 projects beyond the surface of the roller 30 and coacts with the slot 32, as hereinafter described, to form the locked seams for the side seams of the can-body.

The rollers 30 31 rotate in the direction of the arrows in the several figures and are so adjusted with reference to one another that their surfaces may be just far enough apart to permit the metal to form the can to pass between them comparatively freely. The roller 30 is provided just forward of the slot 39 with a slight projecting offset 40, which extends the length of the roller 30 and operates to press down and hold closely to the roller 31 the rear end of the sheet after the can-body is formed during the process, hereinafter described, of forming the seam on the rear edge and interlocking it with the seam upon the forward edge previously formed.

41 indicates a spiral spring, one end of which is secured to the end of the lever 36 and the other end secured to the inner end of the roller 30. The spring 41 operates by its tension to draw the free end of the lever 36 inward of the roller 30 and to hold the tucking-blade 38 against the forward side of the slot 39, which limits the motion of the lever 36, by means of the spring 41.

42 indicates a cam which is secured to the side of the frame 18 between the said frame and the roller 30 and is adapted to bear upon the roller 37 at the outer end of the lever 36 as the roller 30 rotates and to force the free end of said lever outward of the roller 30 against the action of the spring 41 and to rock the rock-shaft 33 backward and carry the tucking-blade 38 backward with it in the slot 39, as hereinafter described.

43 indicates a block which is secured to the side of the frame 18, between it and the end of the roller 30, so as to form a track between its inner surface and the surface of the cam 42, in which the roller 37 will ride.

44 indicates a roller which is keyed to the outer end of the shaft 20, beyond and immediately adjacent to the roller 31. The roller 44 is of very slightly smaller diameter than the roller 31, and, as is best shown in Figs. 9 and 10, is flattened at a portion 45 of its periphery, the central line of which is in alinement with the slot 32 of the roller 31. The flattened portion 45 of the periphery of the roller 44 is provided with a longitudinal recess 46, into which the locked seams of a can will come after they are locked together for the purpose of making the outer surface of the seam substantially flush with the surface of the can when the seams are pressed, as hereinafter described.

47 indicates a seam-presser which is feathered at the outer end of the shaft 22. The outer surface of the presser 47 is circular upon a circle concentric with the axis of the shaft 22. The seam-presser 47 is of such size and is so placed on the shaft that as the shaft 22 and the roller 44 revolve together the outer end of the presser will register with the flattened portion 45 of the roller 44 and will operate to press the sheet of metal firmly down and press the same into the recess 46, so as to bind the locked seams closely together and make the outer surface smooth and flush with the surface of the can. The roller 44 is preferably a split roller provided at the flattened portion with a block 48, (best shown in Fig. 10,) which is feathered upon the shaft 20; but of course the roller 44 may be all formed of one piece with a flattened portion 45 and recess 46 formed on it.

Referring to Figs. 1, 3, and 4, 50 indicates a sleeve which is slidingly mounted upon the shaft 20. 51 indicates a lever which is pivoted to a cross-piece 52, secured to the frame 18. The lower end of the lever 51 is provided with a roller 53, and the upper end is provided with a slot 54, which engages a pin 55 on the sleeve 50. 56 indicates a disk which is keyed or otherwise secured to the shaft 26 and which is provided upon its inner surface with a cam 57. As the disk 56 revolves with the shaft 26 the roller 53 will at the proper time ride up the cam, thus swinging the lever 51 and throwing the sleeve 50 inward upon the shaft 20. 58 indicates a semicylindrical sleeve which surrounds a portion of the roller 31. Its inner surface is recessed, as is best shown in Fig. 4, and provided with a shoulder 59. The shoulder 59 fits closely upon the surface of the roller 31, and the rest of the sleeve, as is best shown in Fig. 4, is separated from the roller 31 by a slight space. The sleeve 58 is connected with the sleeve 50 by means of rods 60. 61 indicates a spiral spring, one end of which is secured to the frame 18 and the other end to the semicylindrical sleeve 58. The spring 61 tends to normally hold the parts in the position shown in Figs. 1, 3, and 4. When the cam 57, however, engages the roller 53, the lever 51, as was said above, is swung, forcing the sleeve 50 inward on the shaft 20 against the action of the spring 61 and forcing the semicylindrical sleeve 58 outward over the surface of the roller 31. As soon as the roller 53 passes the highest point of the cam 57 and is freed from engagement with the cam the spring 61 returns the parts to their normal position. The shaft 26, as was said above, rotates once for every two revolutions of the shafts 20 and 22, and therefore this reciprocating motion of the sleeve 58 is performed once for every two revolutions of the rollers 30 31.

Referring to Fig. 12, where these parts are best shown, 62 indicates a bell-crank lever which is pivoted to the upper surface of the semicylindrical sleeve 58. The longer arm of the bell-crank lever 62 projects over toward the roller 31, and the shorter arm is provided with a spring 63, one end of which is secured thereto and the other to a casing 64 on the sleeve 58. The spring 63 is a contraction-spring and tends normally to draw the shorter arm of the bell-crank lever 62 inward and move the longer arm away from the surface of the roller 31. 65 indicates a pin which is screwed into the frame 18 and projects therefrom and is adjusted by means of a thumb-piece 66. The outer end of the pin 65 operates as a stop for the shorter arm of the bell-crank lever 62 and engages the said arm when the parts are in the position shown in Figs. 3, 4, and 12—that is, when the sleeve 58 is brought to the inward limit of its motion by the spring 61—and the pin 65 operates to engage the shorter arm of the bell-crank lever 62 just before this limit is reached, throwing the longer arm down close to the roller 31, the pin 65 being adjusted by the thumb-piece 66, so that the longer arm of the bell-crank lever 62 may be brought sufficiently close to the roller 31 to press suitably upon the sheet metal in the process of forming the can-body, so as to operate as a tension for said sheet metal and hold it close to the roller.

Referring particularly to Figs. 1 and 2, where the parts about to be described are best shown, 67 indicates a feeding-table upon which the sheets of metal to be formed into cans or other similar articles are placed to be fed into the machine. The forward end of the feeding-table 67 projects into the space between the rollers 30 31, as is best shown in Fig. 2. 68 indicates a bracket secured to the lower surface of the table 67 and depending downward therefrom. 69 indicates a bell-crank lever provided with arms 69$^a$ 69$^b$. The bell-crank lever 69 is pivoted at the lower end of the bracket 68. 70 indicates a roller which is mounted upon the outer end of the arm 69$^a$. 71 indicates a cam which is keyed or otherwise secured to the shaft 26. The cam 71 is provided with a circular portion 71$^a$, a curved cam portion 71$^b$, and a straight cam portion 71$^c$, which bear successively upon the roller 70, as hereinafter described, when the shaft 26 is rotated in the direction indicated by the arrow. The upper end of the arm 69$^b$ of the bell-crank lever 69 enters a slot cut into the rear end of the feeding-table 67. 72 indicates a spiral spring, one end of which is secured to the bracket 68 and the other to the arm 69$^b$ of the bell-crank lever 69. The spring 72 operates by its contraction to draw the upper arm 69$^b$ of the bell-crank lever 69 inward and causes the roller 70 to keep in engagement with the cam 71. 73 indicates a pin which is screwed in the upper end of the arm 69$^b$ of the bell-crank lever 69 and may be adjusted in and out by turning the pin 73. The inner end of the pin 73, when the spring 72 is free to act, bears against the bottom of the slot in the rear of the feeding-table 67 and limits the forward motion of the arm 69$^b$, which forward motion of course may be adjusted by turning the pin 73 in one direction or the other, so as to give the arm 69$^b$ a greater or a less forward movement. 74 indicates a lever which is pivoted in the upper end of the arm 69$^b$ of the bell-crank lever 69 and is provided with a short arm 74$^a$ and a longer curved arm 74$^b$. The curved arm 74$^b$ passes over and bears against the rear end of the feeding-table 67, so that when the arm 69$^b$ of the bell-crank lever 69 is moved forward the forward arm 74$^a$ of the lever 74 will be thrown downward and pressed upon the rear end of a sheet of metal (whose rear edge bears against the forward side of the arm 69$^b$) and operates to hold the sheet of metal down. When the bell-crank lever 69 is rocked to throw the arm 69$^b$ backward, the longer arm 74$^b$ of the lever 74 operates by gravity to raise the arm 74$^a$ and relieve the sheet of metal from pressure. 75 indicates a bracket which is secured to the under surface of the feeding-table 67 and projects downward therefrom. 76 indicates a bell-crank lever having a long arm 76$^a$ and a short arm 76$^b$. The longer arm 76$^a$ extends upward, so that its upper end projects somewhat above the upper surface of the feeding-table 67, as is best shown in Figs. 1, 2, and 6, and is adapted to enter, when the lever is rocked, a suitable slot 77 in the side of the feeding-table 67. The upper end of the arm 76$^a$ is provided with a notch 76$^c$ on its inner side, as is best shown in Fig. 6. The shorter arm 76$^b$ of the bell-crank lever 76 projects inward above the arm 69$^a$ of the bell-crank lever 69 and is so adjusted that when the bell-crank lever 69 is rocked by the cam to raise the arm 69$^a$ the arm 69$^a$ will bear against the short arm 76$^b$ of the bell-crank lever 76 and force it upward, throwing the arm 76$^a$ outward. 78 indicates a spiral spring, one end of which is secured to the frame 18 and the other end to the arm 76$^a$ of the bell-crank lever 76. The spring 78 operates normally to pull the arm 76$^a$ of the bell-crank lever 76 inward, causing its upper end to enter the slot 77 and the notch 76$^c$ to engage and bear upon the upper surface of a sheet of metal laid on the table 67. The table 67 is also provided with pins 79 near the inner edge of the table, which are adjusted to bear against the inner side of a sheet of metal on said table and assist in alining it to the rollers 30, as hereinafter described. 80 indicates a lever which is pivoted below the under surface of the feeding-table 67. The upper end of the lever is given a U-shaped bend 80$^a$ around the inner edge of the feeding-table 67, as is best shown in Fig. 1, and is provided at the end of the upper portion of said U-shaped bend with a set-screw 81. 82 indicates a cam-block which is secured upon the shaft 26 and is adapted as said shaft is rotated to bear upon the lower end of the lever 80 and force the same upward, carrying the U-shaped end 80$^a$ downward and bringing the set-screw 81 to bear upon the upper surface of a sheet of metal on the feeding-table 67 and hold it firmly in place, the set-screw 81 being suitably adjusted for that purpose. When the lower end of the lever 80 passes from engagement with the cam 82, it drops down by gravity, raising the U-shaped end 80$^a$ and lifting the set-screw 81 from engagement with the sheet of metal.

Referring to Figs. 1 and 3, 83 indicates a clamp which is provided with a recess 84 on its inner surface. The end of the shaft 22 is flattened on opposite sides to enter and engage said recess 84, and the clamp 83 is secured in place on the end of the shaft 22 by means of set-screws 85 86. The outer or free end of the clamp 83 is bent inward, as is best shown in Figs. 1 and 3. 87 indicates a roller which is journaled upon the outer end of the shaft 20. The clamp 83 is of such size and is so adjusted that being carried around with the rotation of the shaft 22 the outer bent end of the clamp 83 will bear against the under side of the roller 87 at just the time that the seam-pressing devices operate to press together the locked seams of the side of the can, as hereinafter described, and cause the roller 44 and the seam-presser 47 to be held tightly together, so that they cannot spring apart during the seam-pressing operation.

The operation of the machine is as follows: The machine being set in motion, a sheet of metal to be formed into a can or other similar article is placed upon the surface of the feeding-table 67. The sheet of metal will of course be of suitable size to form the can, the length of course being determined by the circumference of the rollers 30 31, plus the requisite amount to form the locked seams. As soon as the curved cam portion 71$^b$ of the cam 71 reaches the roller 70 the spring 72 will be free to operate, drawing the arm 69$^b$ of the bell-crank lever 69 inward. This engages the end of the sheet of metal and throws it forward into position to have the first locked seam formed, as shown in Fig. 7. At the same time the arm 69$^a$, being left free from the circular portion 71$^a$ of the cam 71, which is the portion of the cam farthest from the center, will drop, allowing the spring 78 to operate to draw the arm 76ª of the bell-crank lever 76 inward into the slot, engaging the side of the sheet of metal and forcing it inward, so that its other edge rests against the stops 79, which, as was said above, are suitably alined for the purpose. At the same time the notch 76ᶜ bears upon the outer edge of the sheet of metal and operates to hold it down upon the table. As soon as the sheet is pushed forward by the bell-crank lever 69 the forward motion of the upper arm 69ᵇ causes the curved portion of the lever 74 to bear against the rear end of the table and forces the forward arm of the lever 74 down upon the rear end of the sheet. Shortly afterward the cam-block 82, operating upon the lower end of the lever 80, raises it, lowering the U-shaped upper arm 80ª and bringing the set-screw 81 down upon the upper surface of the sheet of metal. While the parts are so held, the rollers 30 31 rotating, the tucking-blade 38 bears upon the forward edge of the sheet of metal and forces the same down into the slot 32 on the roller 31. The various positions of the parts during the operation of forming this bend are shown in Fig. 7 and in Figs. 14 to 17, inclusive. The first position is shown in Fig. 7, where the bend is just beginning to be made. The roller 37, riding up the cam 42, is forced gradually downward against the action of the spring 41, throwing the tucking-blade 38 away from the forward side of the slot 39, so as to cause it to properly enter the slot 32. As the rotation continues the tucking-blade is forced still farther down into the slot 32 into the position shown in Fig. 14, in which position the roller 37 has passed just beyond the extreme bearing-surface of the cam 42. The tucking-blade 38, however, is prevented from being thrown back against the forward side of the slot 39 by its engagement with the metal in the slot 32 and is carried still deeper into the slot 32, into the position shown in Fig. 15. The next position is shown in Fig. 16, where the rotation has continued a very little farther. In Fig. 17 the bend in the edge of the metal has been completed and the rock-shaft 33 has been rocked, and the tucking-blade 38 carried still farther away from the forward portion of the slot 39 by its engagement with the metal in the slot 32, the outer end of the lever 36 being carried still farther outward against the action of the spring 41 in order that the tucking-blade 38 as the rollers rotate may be freed from the slot 32. The cam 42 is so shaped, and the slot, rock-shaft, and tucking-blade so placed and adjusted that as the rollers 30 31 rotate the tucking-blade is caused to enter the slot substantially in the line of the projection of said slot into the roller 31, preventing the bending of the parts which would occur if the tucking-blade were fixed in the roller 30 and insuring the forcing of the sheet metal into the slot 32. As the parts have reached the position shown in Fig. 17 the forward end of the sheet of metal will be engaged in the slot 32 by the bend formed by said metal in said slot. Thereupon the roller 70 begins to ride up the straight portion 71ᶜ of the cam 71, lifting the arm 69ª of the bell-crank lever 69 and throwing the arm 69ᵇ backward against the action of the spring 72 in position for its next operation. At the same time the arm 69ª, bearing as it rises upon the arm 76ᵇ of the bell-crank lever 76, forces the end 76ª outward against the operation of the spring 78, freeing the sheet of metal from engagement and bringing the lever 76 into position for the next operation. At about the same time the cam-block 82 passes from engagement with the lower end of the lever 80, allowing it to drop, and raising the upper end of the lever, so as to free the set-screw 81 from engagement with the sheet. It will of course be understood that the engagement of these several parts with the sheet is sufficient to hold the sheet down, so that it will not buckle or spring during the bend-forming operation, but not sufficient to prevent its being drawn forward by the action of the tucking-blade. Thereupon by the rotation of the rollers 30 31 the sheet of metal is carried forward around said rollers. In the meantime, also, the sleeves 50 and 58 have been brought to the position shown in Fig. 3 by the action of the spring 61, and the pin 65 bears upon the short arm of the bell-crank lever 62, throwing its longer arm into engagement with the surface of the metal as the rollers 30 31 rotate to operate as a tension device upon the sheet of metal and to hold the same to the roller 31. As the sheet is carried around the parts in that second revolution reach the position shown in Fig. 9, in which the offset 40 on the roller 30 bears closely against the rear end of the sheet and operates to hold it down firmly upon the roller 31. Thereupon the tucking-blade 38, which has again assumed the position shown in Fig. 1, operates to tuck the rear edge of the sheet into the fold formed in the first edge, the tucking-blade acting in the same manner as when the fold in the first edge was formed, the completed operation being shown in Fig. 10 where the tucking-blade is about to leave the fold. The movements of the tucking-blade are the same as above described for the first rotation of the roller. The can-body is thereupon formed around the roller 31, with the locked seam ready to be pressed. When the can-body has thus been formed and the locked seam formed and the parts have passed just beyond the position shown in Fig. 10, so as to be clear of the seam-presser 47, the cam 57 bears upon the roller 53 during the rotation of the shaft 26, which, as said above, rotates once for every two revolutions of the shafts 20 and 22 on the rollers 30 31. As the roller 53 rides up the cam 57 the lever 51 is rocked, throwing the sleeve 50 and the semicylindrical sleeve 58 forward. The shoulder 59 on the inner surface of the sleeve 58 thereupon engages the inner edge of the can and forces it off the roller 31 upon the roller 44, leaving the rollers 30 31 free to begin the operation of forming and seaming the next sheet of metal. When the roller 53 is freed from the cam 57, the spring 61 immediately retracts the roller 53, as above described. The can being thus slid off the roller 31 upon the roller 44 is in position to have the seam pressed. As was said above, when the can-body thus formed and seamed is slid off from the roller 31 the seam is in register with the recess 46 of the flattened portion 45 of the roller 44. As the parts rotate the seam-presser 47 bears against the flattened portion of the roller 44, as shown in Fig. 17ª, and presses the seam theretofore formed closely together into the recess 46, making the seam tight and making the outer surface flush with the surface of the can-body. In the meanwhile the roller 70, riding upon the circular portion 71ª of the cam 71, (which, as was said above, rotates once for every two revolutions of the rollers 30 31,) leaves the levers 69, 80, and 76 in their positions last above described and ready to operate upon the next sheet of metal, which has been laid upon the table. When the next can is formed in the same manner as that above described and is forced off from the roller 31, it will force from the roller 44 the completed can-body ahead of it, which may be dropped into any suitable receptacle, ready for soldering or any subsequent operation.

That which I claim as my invention, and desire to secure by Letters Patent, is—

1. The combination with a roller provided with a longitudinal groove, of a coacting tucking-blade adapted to register with said groove when said roller is rotated, and means apart from the groove for changing the inclination of said tucking-blade relative to its support, causing it to enter said groove substantially in the line of the projection of said groove into said roller, substantially as described.

2. The combination with a roller having a longitudinal groove projected into said roller at an acute angle with a tangent to the surface of said roller in the line of its rotation, of a coacting tucking-blade adapted to register and coact with said groove as said roller rotates, and means apart from the groove for changing the inclination of said tucking-blade relative to its support, causing it to enter said groove substantially in the line of the projection of said groove into said roller, substantially as described.

3. The combination with a roller having a longitudinal groove, of a coacting axially-supported member, a tucking-blade carried by said coacting axially-supported member, movable relative thereto, and adapted to register and coact with said groove as said roller rotates, means for rocking said tucking-blade to cause the same to enter said groove substantially in the line of the projection of said groove into said roller, and means for driving said roller and said coacting member, substantially as described.

4. The combination with a roller having a longitudinal groove, of a coacting roller, a tucking-blade carried by said second roller movable relative thereto and adapted to register and coact with said groove as said rollers rotate, means for rocking said tucking-blade to cause the same to enter said groove substantially in the line of the projection of said groove into said first roller, and means for driving said rollers, substantially as described.

5. The combination with a roller having a longitudinal groove projected into said roller at an acute angle with a tangent to said roller in the line of its rotation, of a coacting axially-supported member, a tucking-blade carried thereby, and movable relative thereto and adapted to register and coact with said groove as said roller rotates, means for rocking said tucking-blade to cause the same to enter said groove substantially in the line of the projection of said groove into said roller, and means for driving said roller and axially-supported member, substantially as described.

6. The combination with a roller having a longitudinal groove, of a coacting roller, a rock-shaft mounted in said coacting roller, a tucking-blade carried by said rock-shaft and adapted to register and coact with said groove with each rotation of said rollers, means for rocking said rock-shaft to cause the said tucking-blade as said rollers are rotated to enter the said groove substantially in the line of the projection of said groove into said first roller, and means for driving said rollers, substantially as described.

7. The combination with a roller having a longitudinal groove projected into said roller at an acute angle with a tangent to said roller in the direction of its rotation, of a coacting roller, a rock-shaft mounted in said coacting roller, a tucking-blade carried by said rock-shaft and adapted to register and coact with said groove with each rotation of said rollers, means for rocking said rock-shaft to cause the said tucking-blade as said rollers are rotated to enter the said groove substantially in the line of the projection of said groove into said first roller, and means for driving said rollers, substantially as described.

8. The combination with a roller having a longitudinal groove projected into said roller at an acute angle with a tangent to said roller in the direction of its rotation, of a coacting roller, a rock-shaft mounted in said coacting roller, a tucking-blade carried by said rock-shaft and adapted to register and coact with said groove with each rotation of said rollers, means for rocking said rock-shaft to cause the said tucking-blade as said rollers are rotated to enter the said groove substantially in the line of the projection of said groove into said first roller, a projecting offset on the surface of said second roller immediately ahead of said tucking-blade and adapted to press the rear end of a sheet of metal carried around said first-named roller closely against said roller, and means for driving said rollers, substantially as described.

9. The combination with a roller having a longitudinal groove in its surface, and a coacting tucking-blade adapted to register with said groove and enter the same with each rotation of said roller, of a second roller of slightly-smaller diameter than said first roller and on the same axial line therewith, means for pushing a cylinder of metal formed by said first roller and said tucking-blade from said first roller upon said second roller, and a seam-presser adapted to press the interlocked seams formed by said first roller and said tucking-blade firmly together against said second roller, substantially as described.

10. The combination with a roller having a longitudinal groove in its surface, and a coacting tucking-blade adapted to register with said groove and enter the same with each rotation of said roller, of a second roller of slightly-smaller diameter than said first roller and on the same axial line therewith, means for pushing a cylinder of metal formed by said first roller and said tucking-blade from said first roller upon said second roller, a rotary seam-presser adapted to coact with said second roller to press the interlocked seams formed by said first roller and said tucking-blade firmly together against said second roller, and means for rotating said roller and said seam-presser, substantially as described.

11. The combination with a roller having a longitudinal groove projected into its surface at an acute angle with a tangent to said roller in the direction of its rotation, a coacting tucking-blade adapted to register with and enter said groove with each rotation of said roller, and mechanism adapted to cause said tucking-blade to enter said groove substantially in the line of the projection of said groove into said roller, of a second roller upon the same axial line as said first roller, rotating therewith, and having a portion of its periphery flattened, means adapted to push a completed metal cylinder, with interlocked side seams formed by said first roller and said tucking-blade, off said first roller upon said second roller, with its seam lying over the flattened portion thereof, a rotating seam-presser adapted to coact with said second roller and press said interlocked seam closely together against said flattened surface, and means for driving said rollers, said tucking-blade and said seam-presser, substantially as described.

12. The combination with a roller having a longitudinal groove projected into its surface at an acute angle with a tangent to said roller in the direction of its rotation, a coacting tucking-blade adapted to register with and enter said groove with each rotation of said roller, and mechanism adapted to cause said tucking-blade to enter said groove substantially in the line of the projection of said groove into said roller, of a second roller upon the same axial line as said first roller, rotating therewith, and having a portion of its periphery flattened, a reciprocating sleeve bearing against said first roller, means for reciprocating said sleeve, whereby a cylindrical sheet-metal can with an interlocked side seam, formed by said first roller and said tucking-blade, may be freed from said first roller and delivered to said second roller, a rotating seam-presser adapted to coact with said second roller and press said interlocked seam closely together against said flattened surface, and means for driving said rollers, said tucking-blade and said seam-presser, substantially as described.

13. The combination with a roller having a longitudinal groove in its surface projected into said roller at an acute angle with a tangent to said roller in the direction of its rotation, a coacting tucking-blade adapted to register with said groove and enter the same at each rotation of said roller, and means for causing said tucking-blade to enter said groove substantially in the line of its projection into said roller, of a second roller of slightly-smaller size than said first roller, mounted upon the same axial line as said first roller, rotating therewith, and having a portion of its periphery flattened, said flattened portion being provided with a longitudinal recess in register with the groove in said first roller, a reciprocating sleeve embracing said first roller and bearing against the same, means for reciprocating said sleeve once for every two revolutions of said roller, whereby a can-body with interlocking side seams formed by said first roller and said tucking-blade may be pushed from said first roller upon said second roller with its seam in alinement with the recess on the flattened surface of said second roller, a seam-presser adapted to coact with said second roller over its flattened portion and to press the interlocked side seam of a can-body firmly together over said longitudinal recess, and means for driving said rollers and said seam-presser, substantially as described.

14. The combination with a roller having a longitudinal groove in its surface projected into said roller with an acute angle with a tangent to said roller in the direction of its rotation, a coacting tucking-blade adapted to register with said groove and enter the seam at each rotation of said roller, and means for causing said tucking-blade to enter said groove substantially in the line of its projection into said roller, of a second roller of slightly-smaller size than said first roller, mounted upon the same axial line as said first roller, rotating therewith, and having a portion of its periphery flattened, said flattened portion being provided with a longitudinal recess in register with the groove in said first roller, a reciprocating sleeve embracing said first roller and bearing against the same, means for reciprocating said sleeve once for every two revolutions of said roller, whereby a can-body with interlocking side seams formed by said first roller and said tucking-blade may be pushed from said first roller upon said second roller with its seam in alinement with the recess on the flattened surface of said second roller, a seam-presser adapted to coact with said second roller over its flattened portion and to press the interlocked side seam of a can-body firmly together over said longitudinal recess, a tension-lever mounted upon and carried by said sleeve and adapted when said sleeve is brought to the inward limit of its motion to press against a can-body being formed upon said first roller and hold the same closely thereto, and means for driving said rollers and said seam-presser, substantially as described.

15. The combination with rotary can-body-forming, seam-forming and interlocking devices, of a feeding-table adapted to receive sheets of metal preparatory to their being fed to said rotary can-body-forming mechanism, and provided with side stops adapted to engage and aline a sheet of metal when one side is pressed against said side stops, a lever adapted to engage the other side of a sheet of metal and when moved to bring the sheet against said alining-pins, means for operating said lever, a second lever adapted when moved to engage the rear end of a sheet of metal when alined upon said feeding-table and to feed the same at suitable intervals to said can-body-forming mechanism, and means for operating said second lever at suitable intervals, substantially as described.

16. The combination with rotary can-body-forming, seam-forming and interlocking devices, of a feeding-table adapted to receive sheets of metal preparatory to their being fed to said rotary can-body-forming mechanism, and provided with side stops adapted to engage and aline a sheet of metal when one side is pressed against said side stops, a lever adapted when moved to engage one edge of a sheet of metal laid upon said feeding-table and bring the sheet against said alining-pins, and provided with a notch at its upper end adapted to engage the upper surface of a sheet of metal and hold it yieldingly upon said feeding-table, means for operating said lever at suitable intervals, a second lever adapted when moved to engage the rear end of a sheet of metal alined against said stops and to forward the same to said can-body-forming mechanism, means for operating said second lever at suitable intervals, a third lever having its upper end projecting over said feeding-table and provided with a set-screw, and adapted when moved to bring said set-screw down upon the upper surface of a sheet of metal on said feeding-table and press the same against said feeding-table while the forward edge of said sheet of metal is being first engaged by said can-body-forming devices, and means for operating said third lever at suitable intervals, substantially as described.

GEORGE F. LEIGER.

Witnesses:
JOHN L. JACKSON,
HELEN M. COLLIN.